United States Patent [19]

Blau

[11] 4,373,464

[45] Feb. 15, 1983

[54] RESILIENT DOME DEVICE

[75] Inventor: Herbert Blau, Philadelphia, Pa.

[73] Assignee: Blau & Lapides, Inc., Philadelphia, Pa.

[21] Appl. No.: 153,280

[22] Filed: May 27, 1980

[51] Int. Cl.³ .......................... E01F 9/01; E01F 9/06; E01F 11/00
[52] U.S. Cl. .................................. 116/63 R; 404/10
[58] Field of Search ......................... 404/10; 40/608; 116/63 P, 63 R; 267/152

[56] References Cited

U.S. PATENT DOCUMENTS

| 1,337,947 | 4/1920 | O'Toole | 40/608 |
| 1,487,635 | 3/1924 | Watts | 40/608 |
| 1,802,940 | 4/1931 | Cornelius | 404/10 |
| 2,719,214 | 9/1955 | Potter | 40/608 |
| 4,090,465 | 5/1978 | Bell | 40/608 |

FOREIGN PATENT DOCUMENTS 1407719  6/1965  France .................... 267/152

Primary Examiner—Edward R. Kazenske
Assistant Examiner—Denis E. Corr
Attorney, Agent, or Firm—Walter B. Udell

[57] ABSTRACT

A resilient traffic standard or bumper includes a dome of resilient material having a central tubular section oriented orthogonally to the support surface and within which tubular section is disposable any one of a number of different types of standards. The outside of the central tubular section is surrounded by a compression spring which helps to restore the resilient dome to its undeformed shape after it has been impacted by a vehicle. The entire structure is anchored to the support surface through the bottom of the central tubular sections. A plurality of resilient domes are stackable and securable together for anchoring to a wall to function as a resilient bumper.

10 Claims, 7 Drawing Figures

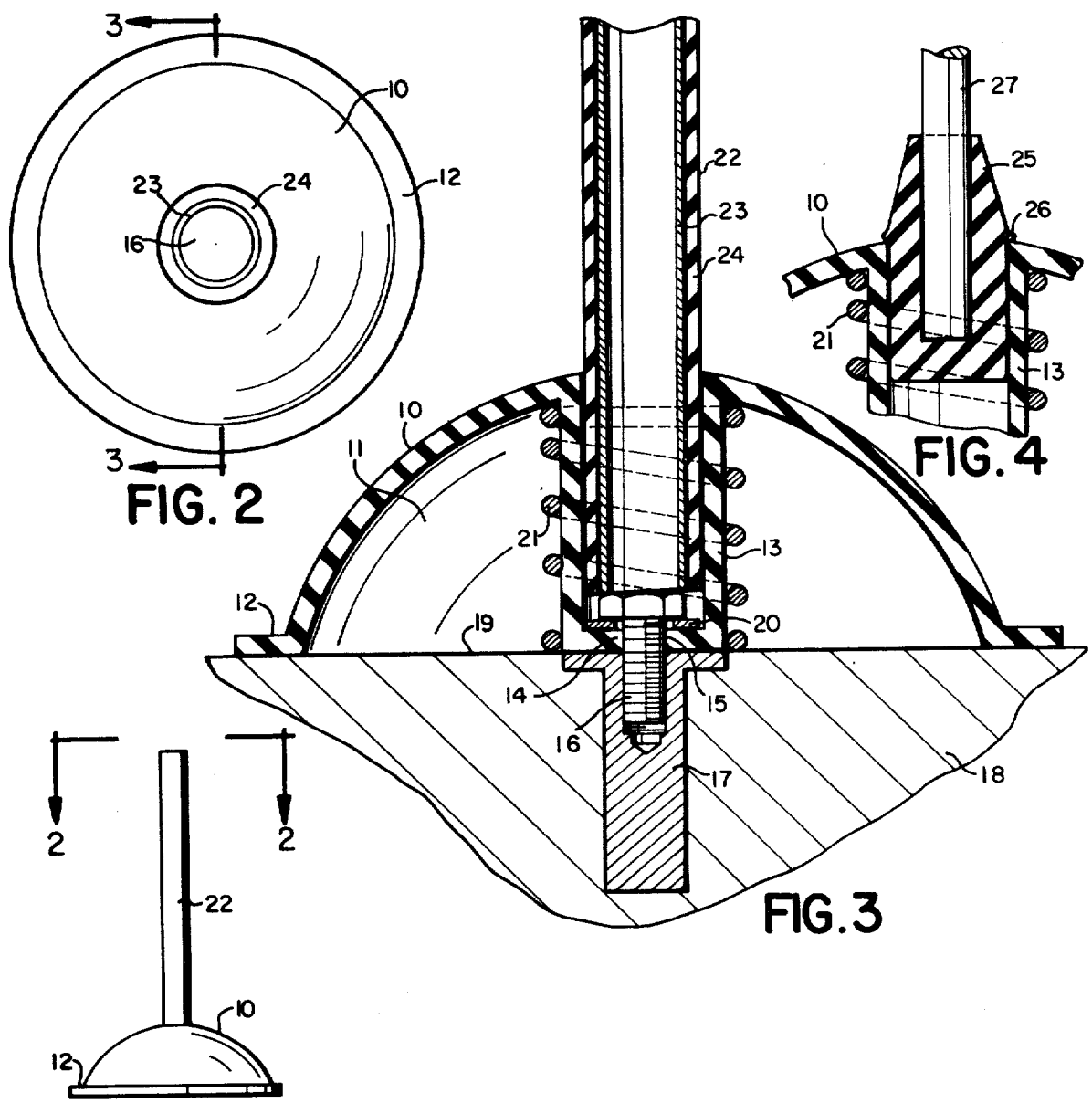
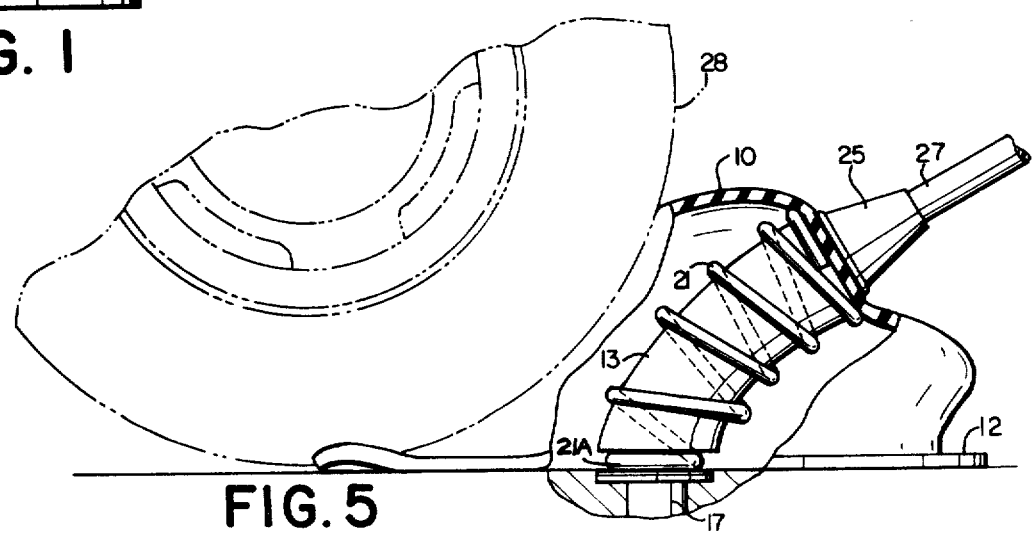

RESILIENT DOME DEVICE

This invention relates generally to a resilient dome device and more particularly relates to a resilient dome device usable as a traffic standard or a bumper cushion capable of withstanding the impact of automotive vehicles without being damaged and without being carried away from their locations of use.

In the past, various types of traffic standards have been utilized, some of which have been made of resilient materials such as rubber or plastic, and have taken the form of cones which may be physically placed where desired and subsequently picked up and removed. Such devices are generally very expensive because they are subject to loss by theft, and have not generally withstood impact in a suitable manner. The resilient traffic standard according to the invention differs from the previously known types of such devices in that it is designed to be fixedly anchored to a supporting surface such as a street or a parking lot. The same resilient dome device according to the invention which is utilizable as a traffic standard is also usable in another application as a resilient wall bumper. Both of these devices, while being fixedly securable to a supporting surface, are also usable in free standing form in which they are not fixedly secured, but may be placed and moved about as desired.

Briefly, the novel resilient traffic standard or bumper includes a dome of resilient material having a central tubular section oriented orthogonally to the support surface and within which tubular section is disposable any one of a number of different types of standards. The outside of the central tubular section is surrounded by a compression spring which helps to restore the resilient dome to its undeformed shape after it has been impacted by a vehicle. The entire structure is anchored to the support surface through the bottom of the central tubular section.

It is a primary object of the invention to provide a novel resilient device usable as a traffic standard for establishing traffic lanes or for display of traffic controlling signs, and for also functioning as a resilient wall bumper.

Another object of the invention is to provide a novel resilient device as aforesaid in the shape of a resilient dome having a central tubular formation open at the top of the dome and extending downward through the hollow interior of the dome to the bottom and functioning as a means of anchoring the dome to a supporting surface.

A further object of the invention is to provide a novel resilient device as aforesaid having a compression spring disposed closely about the outside of the central tubular portion for substantially its full length.

A further object of the invention is to provide a novel resilient device as aforesaid including means for securing a succession of such devices in a stacked array without interfering with the resilient nature of each of the devices.

The foregoing and other objects of the invention will become clear from a reading of the following specification in conjunction with an examination of the appended drawings, wherein:

FIG. 1 is a side elevational view of a resilient traffic standard embodying the invention;

FIG. 2 is a top plan view on an enlarged scale of the resilient traffic standard as would be seen when viewed along the lines 2—2 of FIG. 1;

FIG. 3 is a vertical sectional view on an enlarged scale through the traffic standard as would be seen when viewed along the lines 3—3 of FIG. 2;

FIG. 4 is a vertical sectional detail view of a portion of the resilient traffic standard illustrating the use of a different type of standard in the resilient base;

FIG. 5 is a view illustrating the impacting of an automobile wheel against the resilient traffic standard according to the invention;

Figure 6:
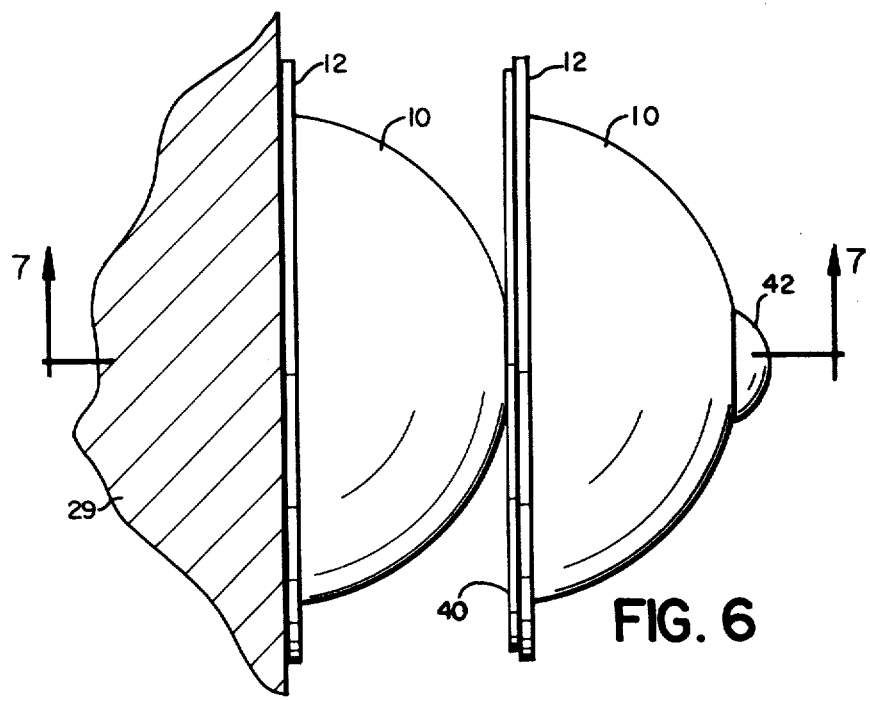
Figure 7:
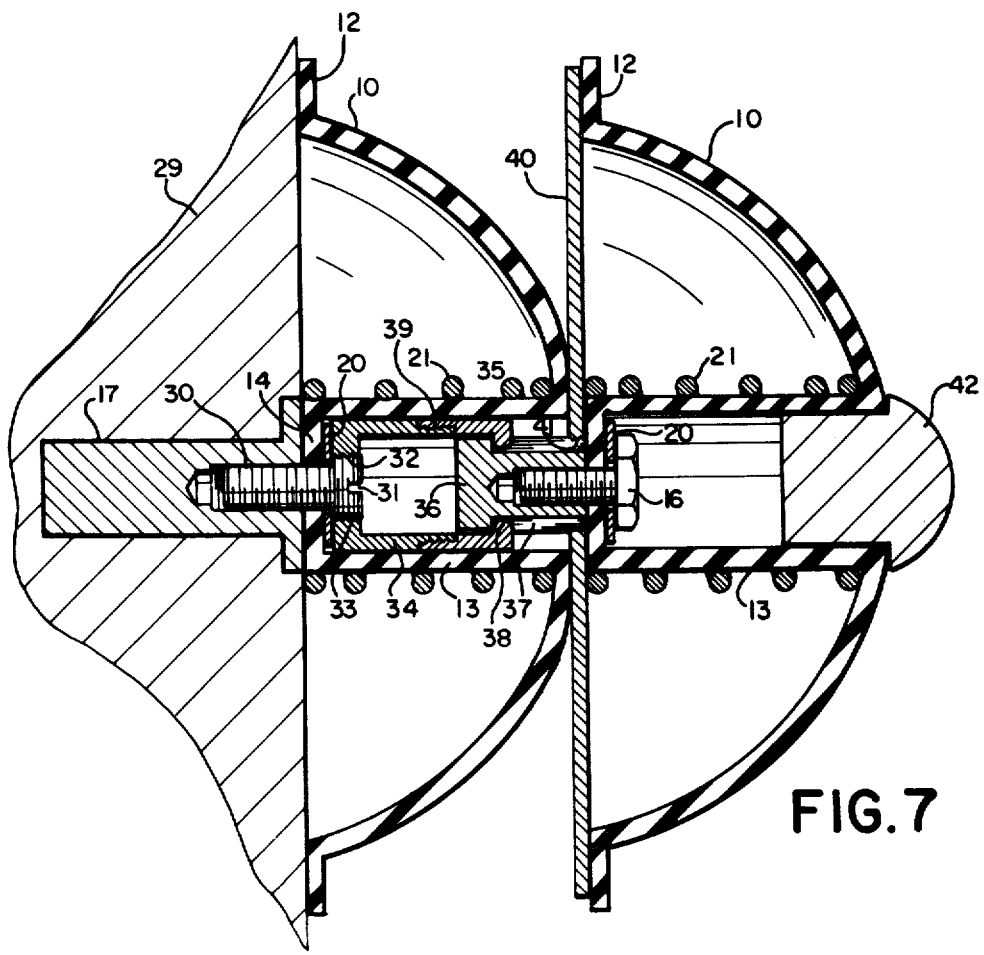

FIG. 6 is a side elevational view of a resilient wall bumper according to the invention utilizing the resilient dome structure of the embodiment of FIGS. 1 through 5; and FIG. 7 is a vertical cross-sectional view through the resilient wall bumper as would be seen when viewed along the lines 7—7 of FIG. 6, and illustrating the internal mechanism for securing the resilient domes to one another in a stacked array.

In the several figures, like elements are denoted by like reference characters.

Considering now first FIGS. 1, 2 and 3, there is seen the resilient traffic standard embodying the invention which includes a hemisphere-like resilient dome 10 having a hollow interior 11 and a flange 12 extending radially outwardly and peripherally completely about the bottom edge of the dome 10. Typically, the dome might be about eleven inches in diameter and about four to five inches in height. A central tubular formation 13 formed integrally with the dome 10 extends vertically centrally from the top of the dome to the bottom of the dome, being open through its vertical extent but terminating in a bottom wall 14. The bottom wall is centrally apertured as at 15 to permit passage therethrough of a securing bolt 16 which secures the entire dome structure to an anchor 17 which is embedded down into the roadbed or parking lot surface 18 with the upper end of the anchor flush with the roadbed surface 19. Placed between the head of the bolt 16 and the tubular formation bottom wall 14 is a rigid disk 20, such as a metal washer, to prevent the bolt head from being pulled through the bottom aperture 15 upon impact of the resilient dome by an automobile.

Disposed closely about the outer surface of the central tubular formation 13 is a compression spring 21 which extends the full length of the central tubular formation 13. The compression spring 21 not only acts to provide a strong restoring force for the resilient dome 10 with respect to forces exerted thereon in axial alignment with the helical axis of the compression spring 21, but also acts to provide a strong restoring force to the resilient dome 10 with respect to forces which bend the spring in cantilever fashion, for example as is illustrated in the showing of FIG. 5 to be subsequently described. A modified spring 21 is shown in FIG. 5 having a reduced diameter bottom loop 21A which underlies the tubular formation 13, the loop 21A being clamped to the roadbed by the bolt 16 to provide improved restoring force.

Placed vertically downward into the hollow cylindrical interior of the central tubular formation 13 is a traffic standard pole 22 which consists of a strong inner tube 23 which may be made of steel, aluminum or any other sufficiently strong and rigid material, and which is closely sheathed about by a resilient tubular covering 24 which may be made of rubber or plastic. The inner tube 23 provides sufficient strength to prevent breakage when impacted by a vehicle, while the outer resilient covering 24 prevents damage to the impacting vehicle. The pole 22, while fitting closely within the central tubular formation 13, is not secured therein, and may be readily removed by a vertically directed pull. The standard 22 may be used merely in the form of a pole, or may have various devices secured to its upper end, as for example a flag or a sign of some sort.

By making the poles readily removable and replaceable, a variety of different functions can be served by the same resilient anchoring dome 10. FIG. 4 illustrates an alternate traffic standard pole structure which includes a plug 25 having a radially outwardly peripherally extending rim 26, the plug 25 being seated downward into the top opening of the central tubular formation 13 until its movement is arrested by the engagement of the plug rim 26 with the top of the dome 10. Insertable within the plug 25 is a staff 27, which may again have a number of different things secured to its upper end determined by the function to be served.

FIG. 5 illustrates the impacting of the resilient traffic standard according to the invention by the wheel 28 of an automobile, which might occur for example when a car is backing out of a parking space on a parking lot and inadvertently runs into a lane marker on the lot. The wheel 28 deforms the resilient dome 10 and bends the central tubular formation 13 together with the compression spring 21 disposed thereabout. However, because the dome and the spring 21 are secured to the anchor 17 at the bottom wall of the central tubular formation 13, the entire resilient dome and traffic standard are not moved out of position and thrown about, but instead remain in position and are resiliently deflected as shown. The cantilever bending of the central tubular formation 13 and the compression spring 21 provide a strong restoring force to the dome 10 so that when the automobile wheel 28 is moved away from the standard, the spring 21 assists the resilient dome 10 in reassuming its undeformed position as shown in FIG. 3.

FIGS. 6 and 7 illustrate a pair of resilient domes 10 stacked and secured together and anchored to a wall to function as a resilient bumper. The resilient domes 10 are in all particulars the same as the dome 10 which has been described in connection with FIGS. 1 through 5, the difference residing in the means utilized to secure the domes in the stacked arrangement shown. While only two domes are illustrated as being stacked, it will be appreciated that the arrangement illustrated and to be now described is suitable for stacking any desired number of such domes by merely utilizing more domes and additional interconnecting devices as hereinafter described.

As best seen in FIG. 7, one dome 10 is anchored to the wall 29 by means of an anchor 17 and a bolt 30 in exactly the same manner as has already been shown and described in connection with FIG. 3. However, the bolt 30 differs from the bolt 16 in that it is provided with a slot 31 in the bolt head for tightening the bolt to the anchor, and is provided on the outer periphery of the bolt head with screw threads 32 which are engagable with complementally formed screw threads 33 formed in a bottom aperture in a cup-shaped cylindrical member 34 which just fits within the hollow interior of the central tubular formation 13 and seats at the bottom thereof when fully screwed onto the head of the bolt 30. The cylindrical member 34 may conveniently be screwed down onto the bolt 30 after it has been assembled as a unit with retaining ring 35 and piston 36.

The piston 36 is provided with grooves 37 within which are disposed fingers or projections 38 carried by the retaining ring 35. This arrangement permits the piston 36 to reciprocate within the retaining ring 35 and cup-shaped cylindrical member 34, and, as will be seen, secures the two resilient domes together. The retaining ring 35 and cup-shaped cylindrical member 34 are threadly engaged as at 39 to secure these two elements fixedly together. The outer end of piston 36 is provided with threads for securement thereon of a rigid disk 40 by means of the threaded engagement 41. The rigid disk 40, which may be made of metal or sufficiently strong plastic, mechanically stabilizes the outer resilient dome 10 by providing a surface against which the dome flange 12 may seat. The outer resilient dome 10 is secured to the inner dome by means of the bolt 16 which is threadedly engaged into the outer end of the piston 36. The open end of the central tubular formation 13 in the outer dome 10 is conveniently closed by means of a plug 42.

The resilient bumpering action of the multiple dome array occurs in the following way. When the plug 42 or outer dome 10 is impacted by an object moving toward the wall 29, the force of the moving object compresses the domes 10 and the compression springs 21 in axial direction. The outer dome is enabled to collapse to the full extent by impingement of the compression spring coils against one another. The inner dome is compressible within the limits provided by movement of piston 36 within the cup-shaped cylindrical member 34 and retaining ring 35, which movement of course may be designed to be the same as that allowed by compression of the spring 21. Upon removal of the compressing force, the compression springs 21, as well as the resilient nature of the domes themselves, cause the domes to spring back to their undeflected positions as illustrated in FIGS. 6 and 7.

If desired, the compression spring in the wall engaging dome may be made stiffer than the compression spring 21 which first receives the compressing impact so that the outer resilient dome will collapse somewhat more quickly than the wall engaging dome, and take up the initial cushioning shock. In this way, the array may be caused to absorb impact by having such impact successively absorbed by the domes from outermost to innermost. However, if desired, all of the compression springs 21 may be of the same strength so that the compressive forces exerted by impact will be substantially absorbed equally by the separate dome elements.

Having now described my invention in conjunction with particularly illustrated embodiments thereof, variations and modifications may now naturally occur from time to time to those persons normally skilled in the art without departing from the essential scope or spirit of the invention, and accordingly it is intended to claim the same broadly as well as specifically as indicated by the appended claims.

What is claimed to be new and useful is:

1. A resilient dome device comprising in combination,
   (a) a hollow dome made of resilient material, said dome having a top and a base,
   (b) a central tubular formation of resilient material secured to and extending vertically centrally downward from the top of the dome substantially to the base of the dome, said tubular formation being open at its upper end and through the top of the dome and downward through at least most of its vertical extent, whereby said tubular formation is adapted to receive within it a cylindrical member projected thereinto, (c) a spring disposed about the outer surface of and extending substantially the full length of the said central tubular formation thereby helping to restore the resilient dome to its undeformed shape, and (d) means for connecting said device to a supporting surface against which said dome base is disposable.

2. A resilient dome device as described in claim 1 wherein said hollow dome is hemisphere-like in shape.

3. A resilient dome device as described in claim 1 wherein said spring is a helical compression spring disposed closely about said central tubular formation.

4. A resilient dome device as described in claims 1, 2 or 3 wherein said connecting means comprises means for anchoring the lower end of said central tubular formation to a supporting surface against which said dome base is disposable.

5. At least two resilient dome devices as described in claim 1 arranged in a dome-to-base stacked array further including coupling means for operatively securing said resilient domes to one another in said stacked array.

6. A stacked array of resilient domes as described in claim 5 wherein said coupling means comprises means disposed within and translatable within the central tubular formation of each resilient dome device which has its dome secured to the base of another dome.

7. A stacked array of resilient domes as described in claim 5 wherein said coupling means comprises reciprocatable means disposed within the central tubular formation of each resilient dome device which has its dome secured to the base of another dome.

8. At least two resilient dome devices as described in claim 3 arranged in a dome-to-base stacked array further including coupling means for operatively securing said resilient domes to one another in said stacked array.

9. A stacked array of resilient domes as described in claims 5, 6, 7 or 8 further including support surface means secured to and interposing each adjacent pair of resilient dome devices and against which said surface the base of one of said domes is disposed.

10. A resilient dome device as described in claims 1 or 3 wherein said spring includes means at its lower end for fixedly securing said spring to a supporting surface against which said dome base is disposable.

* * * * *